(12) United States Patent
Lin et al.

(10) Patent No.: US 12,700,065 B2
(45) Date of Patent: Aug. 4, 2026

(54) IMAGE PROCESSING METHOD AND APPARATUS, AND ELECTRONIC DEVICE AND STORAGE MEDIUM

(71) Applicant: BEIJING ZITIAO NETWORK TECHNOLOGY CO., LTD., Beijing (CN)

(72) Inventors: Qianxia Lin, Beijing (CN); Lu Lu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 18/551,684

(22) PCT Filed: Mar. 21, 2022

(86) PCT No.: PCT/CN2022/081938
§ 371 (c)(1),
(2) Date: Sep. 21, 2023

(87) PCT Pub. No.: WO2022/213798
PCT Pub. Date: Oct. 13, 2022

(65) Prior Publication Data
US 2024/0177272 A1      May 30, 2024

(30) Foreign Application Priority Data

Apr. 8, 2021      (CN) .......................... 202110379814.0

(51) Int. Cl.
*G06T 5/50* (2006.01)
*H04N 23/63* (2023.01)

(52) U.S. Cl.
CPC ............. *G06T 5/50* (2013.01); *H04N 23/632* (2023.01); *G06T 2200/24* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS 9,392,165 B2 * 7/2016 Choi .................... H04N 23/951
10,104,312 B2 * 10/2018 Eum .................... H04N 23/632
(Continued)

FOREIGN PATENT DOCUMENTS

CN      107395966 A      11/2017
CN      108921795 A      11/2018
(Continued)

OTHER PUBLICATIONS

English translation of KR-20150135591-A, Kang, 2015 (Year: 2015).*
(Continued)

*Primary Examiner* — James M Hannett
(74) *Attorney, Agent, or Firm* — Astute IP Law Group

(57) ABSTRACT

Image processing method and apparatus, and an electronic device and a storage medium are provided. The method comprises: acquiring a plurality of images to be processed; in response to acquiring a fusion instruction, performing fusion processing on the plurality of images to be processed and one or more first preset images, so as to obtain one or more fused target images, wherein the target images comprise objects to be processed, which respectively correspond to the plurality of images to be processed; and displaying the one or more fused target images.

18 Claims, 9 Drawing Sheets

Upon detecting a trigger operation on a preset identification, a user interface is displayed, where the user interface includes a first area and a second area, the first area is configured to display a first to-be-processed image, the second area is configured to display a second to-be-processed image, and the second to-be-processed image includes an image captured by a photographing device — 1010

The first to-be-processed image and the second to-be-processed image are acquired — 1020

A first to-be-processed object is acquired from the first to-be-processed image, and a second to-be-processed object is acquired from the second to-be-processed image — 1030

The first to-be-processed object and the second to-be-processed object are fused into one or more first preset images to obtain one or more target images subjected to fusion, where the target image includes the first to-be-processed object subjected to fusion and the second to-be-processed object subjected to fusion — 1040

The one or more target images subjected to fusion are displayed — 1050

(56) References Cited

U.S. PATENT DOCUMENTS

| | | | | |
|---|---|---|---|---|
| 12,337,244 B1 * | 6/2025 | Gaiduchenko | .......... | A63F 13/86 |
| 2017/0339347 A1 * | 11/2017 | Cho | ...................... | G06F 3/0488 |
| 2018/0084119 A1 * | 3/2018 | Yoshida | ............... | G11B 27/028 |
| 2019/0244050 A1 * | 8/2019 | Lin | ......................... | G06V 10/17 |

FOREIGN PATENT DOCUMENTS

| | | | | | |
|---|---|---|---|---|---|
| CN | 109801249 A | | 5/2019 | | |
| CN | 110992256 A | * | 12/2019 | | |
| CN | 112488085 A | | 3/2021 | | |
| CN | 112560698 A | | 3/2021 | | |
| JP | 2004288222 A | | 10/2004 | | |
| KR | 20150135591 A | * | 12/2015 | ............. | G06Q 50/10 |
| WO | WO-2019233229 A1 | * | 12/2019 | ............... | G06T 3/60 |
| WO | WO-2021242005 A1 | * | 12/2021 | ............. | G06T 11/60 |

OTHER PUBLICATIONS

English translation of WO-2019233229-A1, Zhou, 2019 (Year: 2019).*

English translation of WO-2021242005-A1, An, 2021 (Year: 2021).*

English translation of CN 20191129916, Luo, 2020 (Year: 2020).*

International Search Report (with English translation) and Written Opinion issued in PCT/CN2022/081938, dated Jun. 1, 2022, 11 pages provided.

First Office Action for Chinese Application No. 202110379814.0, mailed Apr. 18, 2025, 14 pages.

* cited by examiner

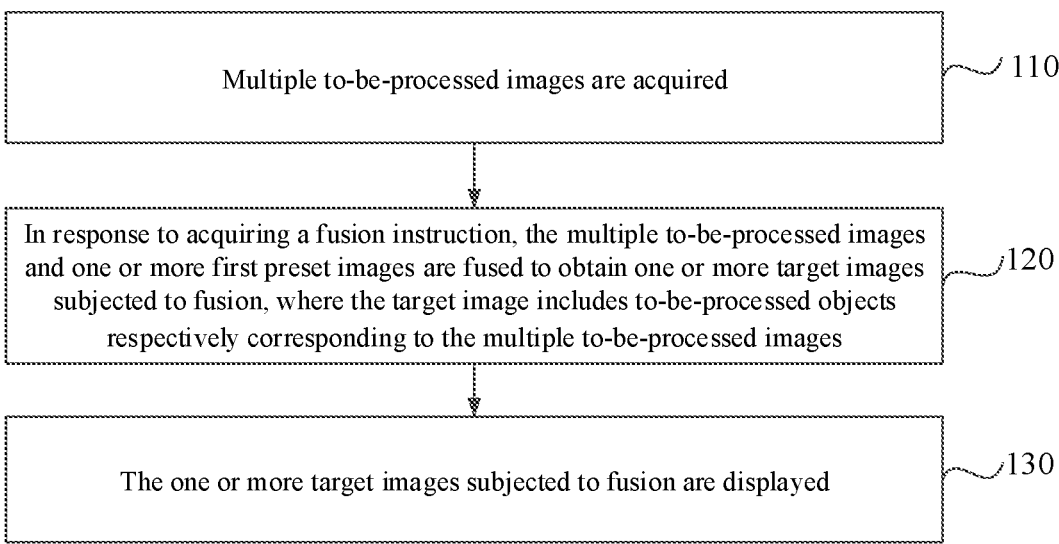

Multiple to-be-processed images are acquired    110

In response to acquiring a fusion instruction, the multiple to-be-processed images and one or more first preset images are fused to obtain one or more target images subjected to fusion, where the target image includes to-be-processed objects respectively corresponding to the multiple to-be-processed images    120

The one or more target images subjected to fusion are displayed    130

Figure 1

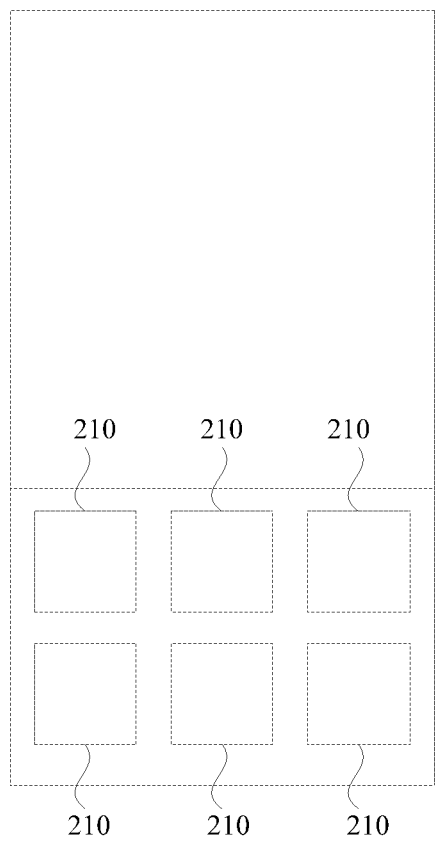

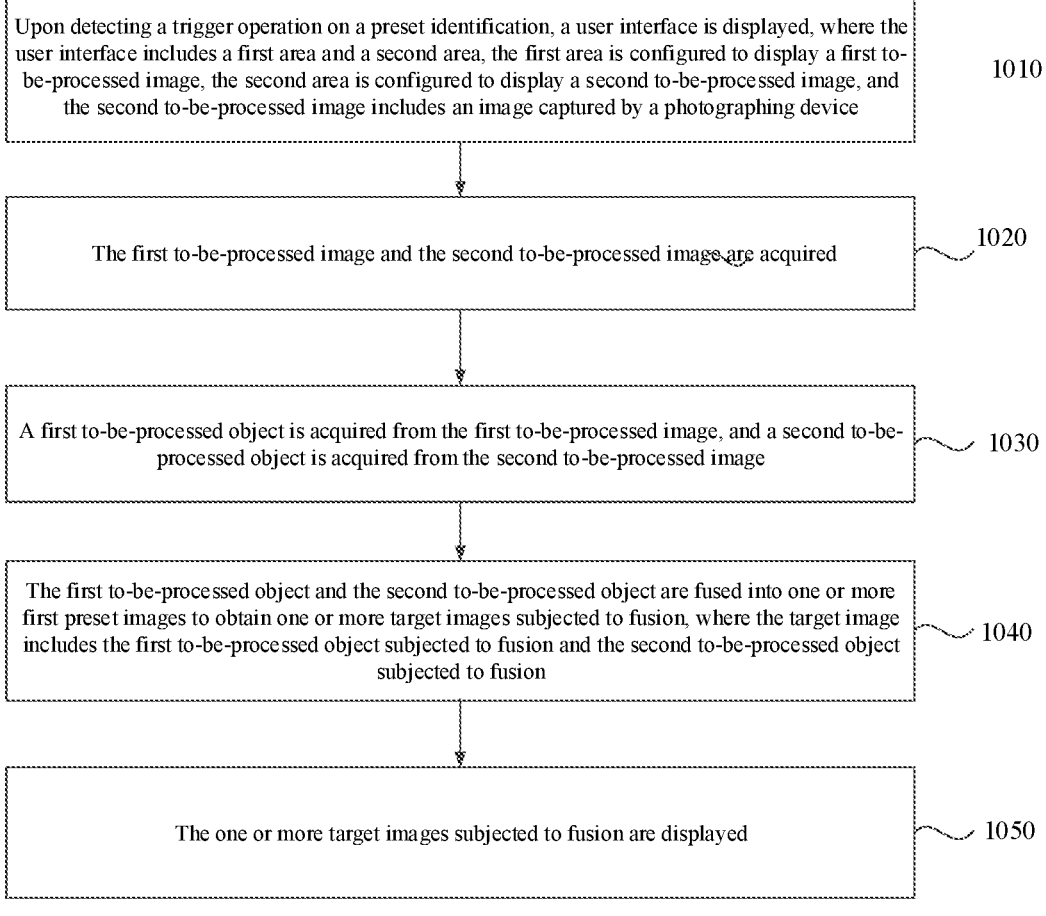

Upon detecting a trigger operation on a preset identification, a user interface is displayed, where the user interface includes a first area and a second area, the first area is configured to display a first to-be-processed image, the second area is configured to display a second to-be-processed image, and the second to-be-processed image includes an image captured by a photographing device                    1010

The first to-be-processed image and the second to-be-processed image are acquired                    1020

A first to-be-processed object is acquired from the first to-be-processed image, and a second to-be-processed object is acquired from the second to-be-processed image                    1030

The first to-be-processed object and the second to-be-processed object are fused into one or more first preset images to obtain one or more target images subjected to fusion, where the target image includes the first to-be-processed object subjected to fusion and the second to-be-processed object subjected to fusion                    1040

The one or more target images subjected to fusion are displayed                    1050

Figure 10

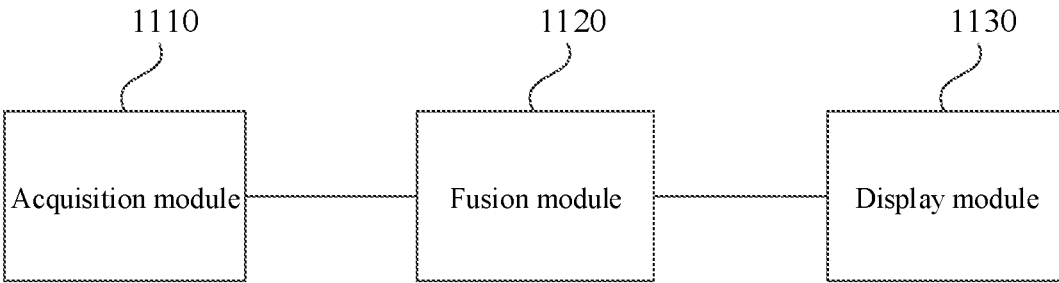

1110                              1120                              1130

| Acquisition module | Fusion module | Display module |

Figure 11

IMAGE PROCESSING METHOD AND APPARATUS, AND ELECTRONIC DEVICE AND STORAGE MEDIUM

This application is the national phase of International Patent Application No. PCT/CN2022/081938 filed on Mar. 21, 2022, which claims the priority to Chinese patent application No. 202110379814.0, titled "IMAGE PROCESSING METHOD AND APPARATUS, AND ELECTRONIC DEVICE AND STORAGE MEDIUM", filed on Apr. 8, 2021 with the China National Intellectual Property Administration, both of which are incorporated herein by reference in their entireties.

FIELD

The present disclosure relates to the field of information technology, and in particular to a method and an apparatus for image processing, an electronic device and a storage medium.

BACKGROUND

With the development of image processing technology, a terminal device or a server can process an image to obtain a processed image.

However, conventional image processing for special effects and/or props are relatively simple, which lowers the user experience.

SUMMARY

In order to solve the above technical problem or at least partially solve the above technical problem, a method and an apparatus for image processing, an electronic device and a storage medium are provided according to the embodiments of the present disclosure, which realizes fusion processing on to-be-processed images, enriches an image processing mode, and contributes to improving the use experience of a user.

A method for image processing is provided according to an embodiment of the present disclosure. The method includes:

acquiring multiple to-be-processed images;

in response to acquiring a fusion instruction, fusing the multiple to-be-processed images and one or more first preset images to obtain one or more target images subjected to fusion, where the target image includes to-be-processed objects respectively corresponding to the multiple to-be-processed images; and displaying the one or more target images subjected to fusion.

An apparatus for image processing is further provided according to an embodiment of the present disclosure. The apparatus includes an acquisition module, a fusion module and a display module.

The acquisition module is configured to acquire multiple to-be-processed images.

The fusion module is configured to: in response to acquiring a fusion instruction, fuse the multiple to-be-processed images and one or more first preset images to obtain one or more target images subjected to fusion, where the target image includes to-be-processed objects respectively corresponding to the multiple to-be-processed images.

The display module is configured to display the one or more target images subjected to fusion.

An electronic device is further provided according to an embodiment of the present disclosure. The electronic device includes: one or more processors: and a storage apparatus configured to store one or more programs.

The one or more programs, when executed by the one or more processors, cause the one or more processors to implement the foregoing method for processing the image.

A computer readable storage medium on which a computer program is stored is further provided according to an embodiment of the present disclosure. The program, when executed by a processor, implements the foregoing method for processing the image.

A computer program product is further provided according to an embodiment of the present disclosure. The computer program product includes a computer program or instruction. The computer program or instruction, when executed by a processor, implements the foregoing method for processing the image.

Compared with the conventional art, the technical solutions according to the embodiments of the present disclosure at least have the following advantages.

In a method for image processing according to an embodiment of the present disclosure, multiple to-be-processed images and one or more first preset images are fused to obtain one or more target images subjected to fusion, and the target image includes to-be-processed objects respectively corresponding to the multiple to-be-processed images, which realizes processing on to-be-processed images, enriches image processing mode, and contributes to improving the use experience and the enjoyment of the user.

BRIEF DESCRIPTION OF THE DRAWINGS

In conjunction with the drawings and with reference to the following embodiments, the above and other features, advantages and aspects of the embodiments of the present disclosure are more apparent. Throughout the drawings, the same or similar reference numbers refer to the same or similar elements. It should be understood that the drawings are schematic and that the components and elements are not necessarily drawn to scale.

FIG. 1 is a flowchart of a method for image processing according to an embodiment of the present disclosure;

FIG. 2 is a schematic diagram of a display interface according to an embodiment of the present disclosure;

FIG. 10 is a flowchart of a method for image processing according to another embodiment of the present disclosure;

FIG. 11 is a schematic structural diagram of an apparatus for image processing according to an embodiment of the present disclosure.

DETAILED DESCRIPTION OF EMBODIMENTS

Figure 3:
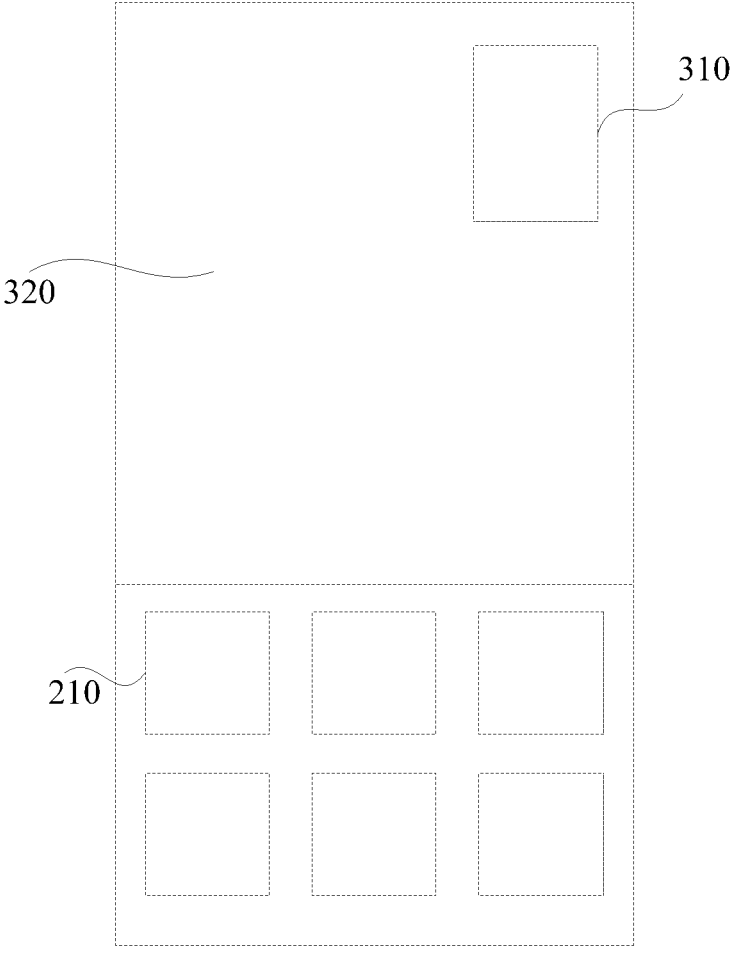
FIG. 3 is a schematic diagram of a first user interface according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The wording "include" and its variations in the present disclosure mean open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" mentioned in the present disclosure are used to distinguish different devices, modules or units, and are not used to limit an sequential order or interdependence of the functions performed by the devices, modules or units.

It should be noted that the wordings such as "one" and "multiple" mentioned in the present disclosure are illustrative and not restrictive. Those skilled in the art should understand that the modifications should be understood as "one or more" unless otherwise expressly indicated in the context.

The name of a message or information exchanged between devices in the embodiments of the present disclosure are only for illustrative purposes, and are not intended to limit the scope of the message or information.

FIG. 1 is a flowchart of a method for image processing according to an embodiment of the present disclosure. The present embodiment may be applicable in a case where image processing is performed in a client device. The method may be performed by an apparatus for image processing. The apparatus may be implemented with software and/or hardware, and may be configured in an electronic device. The electronic device, such as a terminal device, includes but not limited to a smart phone, a palmtop computer, a tablet computer, a wearable device with a display screen, a desktop computer, a notebook computer, an all-in-one computer and a smart home device.

As shown in FIG. 1, the method may include steps 110 to 130.

In step 110, multiple to-be-processed images are acquired.

Multiple usually means at least two. In an embodiment, acquiring multiple to-be-processed images may include:

upon detecting a trigger operation on a preset identification, displaying a user interface, where the user interface includes a first area and a second area, the first area is configured to display a first to-be-processed image, the second area is configured to display a second to-be-processed image, and the second to-be-processed image includes an image captured by a photographing device; and acquiring the first to-be-processed image and the second to-be-processed image.

Referring to a schematic diagram of a display interface shown in FIG. 2, the display interface includes a preset identification 210. When a user triggers a specific preset identification 210, a first user interface as shown in FIG. 3 is displayed. The user interface includes a first area 310 and a second area 320. The first area 310 is configured to display a first to-be-processed image, and the second area 320 is configured to display a second to-be-processed image. The second area 320 may be understood as a main screen of the user interface, with a large display area. The first area 310 is a part of the second area 320, with a smaller display area. Different preset identifications 210 may represent different image processing modes with different effects, i.e., image objects participating in the fusion are different, thus target images obtained after image processing have different effects. For example, a background of a target image obtained by triggering a preset identification 210 related to spring may be spring scenery, and a background of a target image obtained by triggering a preset identification 210 related to winter may be winter scenery, such as snow. Different preset identifications 210 may also represent different props. By providing multiple optional props with different special effects (i.e., preset identifications 210), the gameplay of props is increased, thus improving the use experience of a user.

Figure 4:
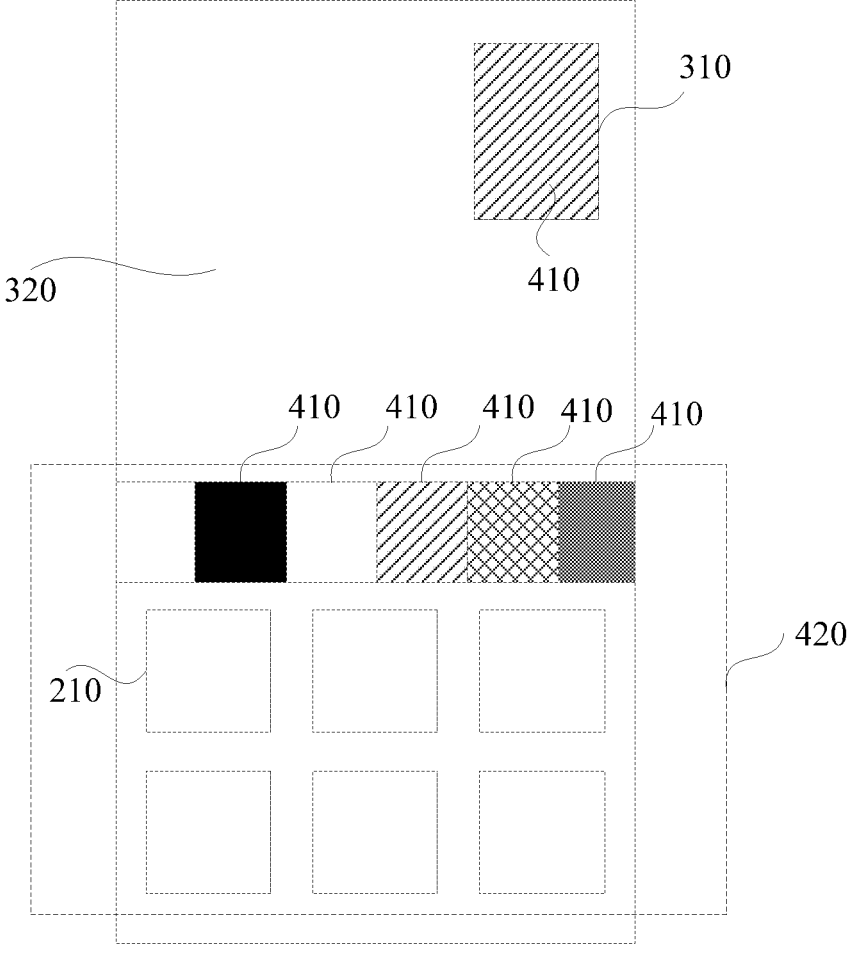
FIG. 4 is a schematic diagram of a second user interface according to an embodiment of the present disclosure.
Figure 5:
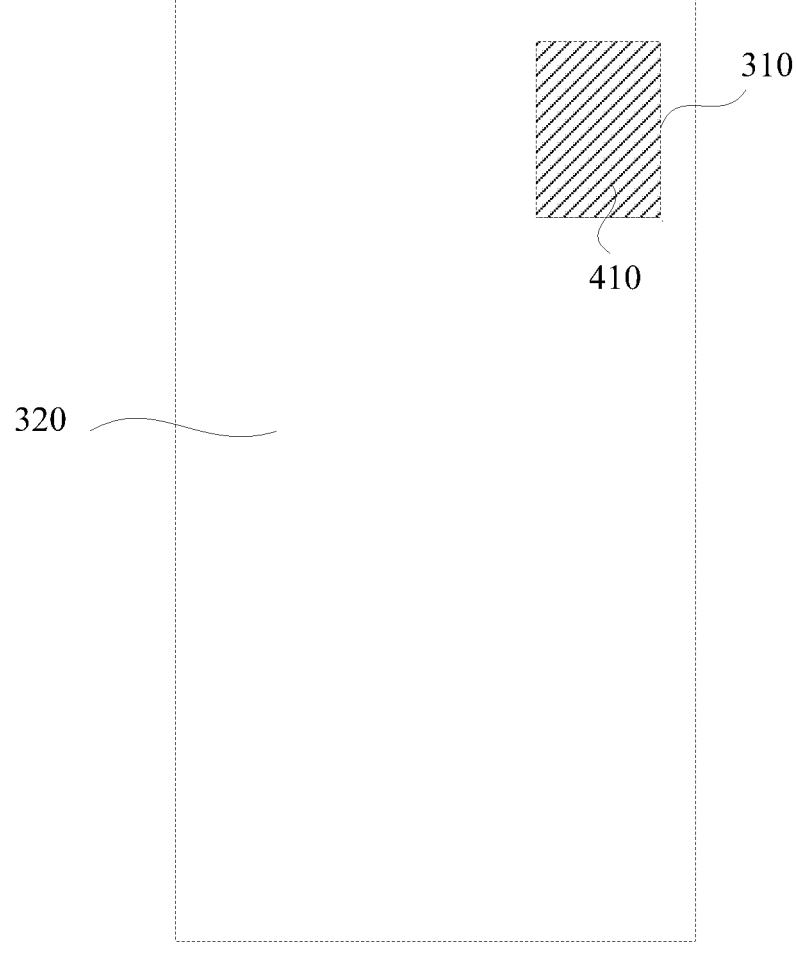
FIG. 5 is a schematic diagram of a third user interface according to an embodiment of the present disclosure.

In one embodiment, referring to a schematic diagram of a second user interface shown in FIG. 4, the user interface further includes one or more second preset images 410. Before acquiring the first to-be-processed image and the second to-be-processed image, the method for processing the image according to the embodiment further includes displaying, in the first area 310, the first to-be-processed image in the one or more second preset images. As shown in FIG. 4, a first to-be-processed image 410 is displayed in the first area 310, and the first to-be-processed image 410 may be an image selected by the user from the multiple second preset images. Upon detecting a selection instruction of the user, the first to-be-processed image selected by the user is displayed in the first area 310, and at the same time, a panel 420 disappears from the user interface, i.e., the user interface no longer displays other second preset images 410 and the preset identification 210. As shown in a schematic diagram of a third user interface shown in FIG. 5, the user interface only displays the first area 310 and the second area 320.

In an alternative embodiment, description is made by assuming that the to-be-processed image is a face image, and the second preset image may be a single person photo or a multi-person photo. If the second preset image is the single person photo, the second preset image is directly displayed in the first area. Alternatively, a face in the second preset image is cut out, resized and then displayed in the first area. If the second preset image is the multi-person photo, a face with a largest size and/or a highest definition and/or a most front position in the photo may be identified and displayed in the first area as the first to-be-processed image. Alternatively, each face area in the second preset image is marked separately, and the user may choose a face area image to be displayed in the first area as the first to-be-processed image. Positions of the first area and the second area in the user interface may also be referred to FIG. 6, which includes a first area 601 and a second area 602.

In an embodiment, the first area 310 displays a third preset image. Upon detecting a selection instruction of the user to select a first to-be-processed image from the multiple second preset images, the third preset image is replaced with the first to-be-processed image selected by the user, i.e., the first to-be-processed image is displayed in the first area 310, or in other words, the third preset image in the first area 310 is replaced with the first to-be-processed image in one or more second preset images for display. The third preset image may be a template image or a base image defaulted by system. If the user does not select the first to-be-processed image from the multiple second preset images, the second to-be-processed image displayed in the second area may be fused with the third preset image to obtain a fused image, i.e., the second to-be-processed image is fused into the third preset image. A case in which both the second to-be-processed image and the third preset image are human images containing faces is taken as an example. In a case that the second to-be-processed image is fused with the third preset image, a face image in the second to-be-processed image may be fused with the third preset image to obtain a fused image. Combining with a background in the third preset image, the image processing mode can be enriched and the use experience and the enjoyment of the user can be improved. If an instruction of the user to select a first to-be-processed image from the multiple second preset images is detected, the first to-be-processed image selected by the user is displayed in the first area, and in this case the second to-be-processed image displayed in the second area is fused with the first to-be-processed image displayed in the first area to obtain a fused image.

In an embodiment, both the first to-be-processed image and the second to-be-processed image are photos photographed in real time by a photographing device (for example, a front camera or a rear camera of a terminal device). Then, before acquiring the first to-be-processed image and the second to-be-processed image, the method for processing the image further includes:

acquiring a captured image of the photographing device, where the captured image includes a first to-be-processed object and a second to-be-processed object; acquiring the first to-be-processed image corresponding to the first to-be-processed object and the second to-be-processed image corresponding to the second to-be-processed object from the captured image; and displaying the first to-be-processed image in the first area and displaying the second to-be-processed image in the second area.

The first to-be-processed object in the first to-be-processed image includes an to-be-processed object that meets a preset condition in remaining of the to-be-processed objects captured by the photographing device other than the second to-be-processed object, and the second to-be-processed object includes an to-be-processed object in the second to-be-processed image. That is, the first to-be-processed object and the second to-be-processed object are two different objects. By taking a face image as an example, the first to-be-processed object and the second to-be-processed object correspond to different face images. For example, the first to-be-processed object is a face area of a user A, and the second to-be-processed object is a face area of a user B.

Figures 6, 7:
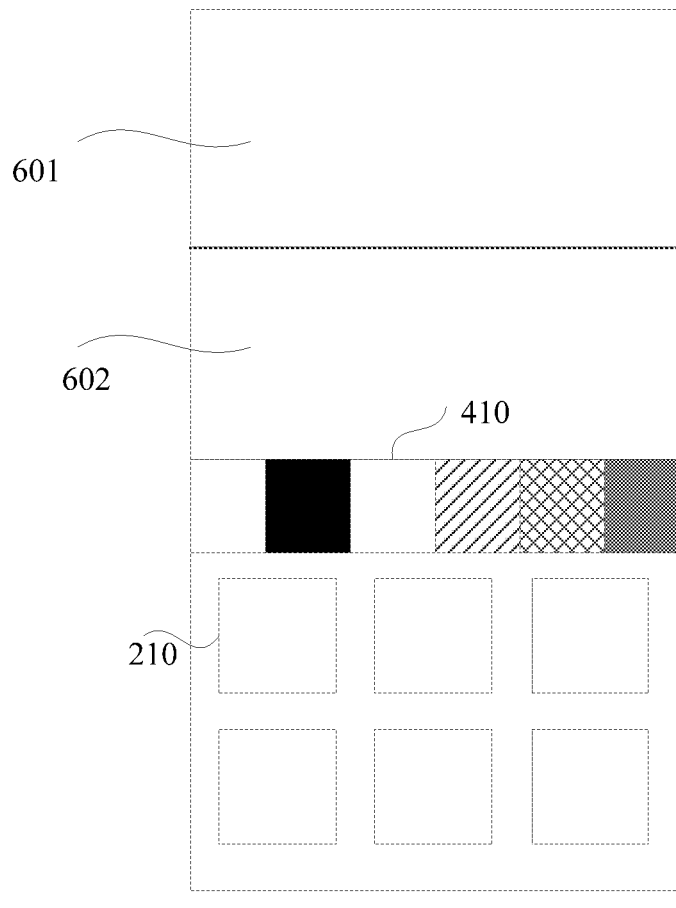
FIG. 6 is a schematic diagram of a user interface according to an embodiment of the present disclosure.
FIG. 7 is a schematic diagram of a captured image according to an embodiment of the present disclosure.
Figure 8:
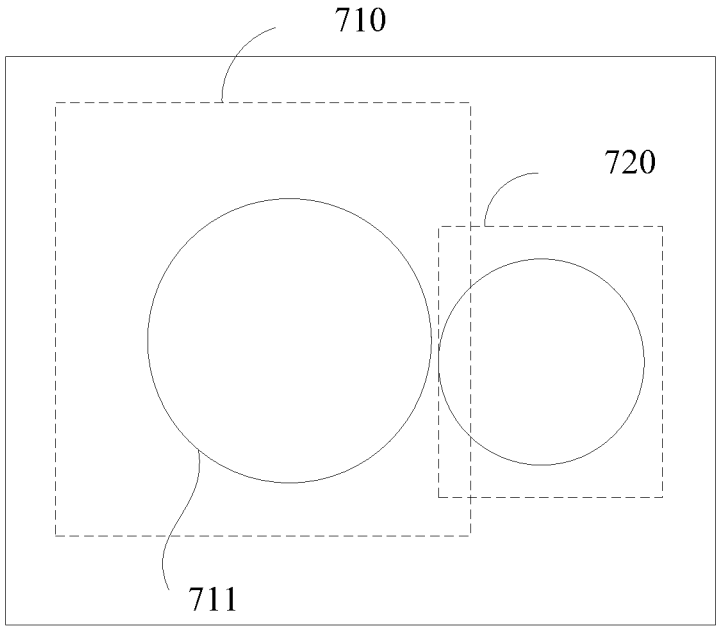
FIG. 8 is a schematic diagram of a captured image according to another embodiment of the present disclosure.

In an embodiment, if the captured image includes two face images, the acquiring the first to-be-processed image corresponding to the first to-be-processed object and the second to-be-processed image corresponding to the second to-be-processed object from the captured image includes: identifying each face in the captured image; and marking the identified face with a rectangular frame. In a schematic diagram of a captured image as shown in FIG. 7, an image in an area occupied by a larger rectangular frame 610 may be determined as the second to-be-processed image, in which a face 611 is the second to-be-processed object; and an image in an area occupied by a smaller rectangular frame 620 is determined as the first to-be-processed image, in which a face 621 is the first to-be-processed object. In the captured image shown in FIG. 7, because the face 611 occupies a relatively large area in the rectangular frame 610, when the second to-be-processed image is displayed in the second area, it will result in a bad feeling that the face fills the whole screen. Therefore, the rectangular frame 610 may be enlarged, as shown by the captured image in FIG. 8, in which a rectangular frame 710 is enlarged a little bit as compared with the rectangular frame 620, for example, some backgrounds are enclosed. Alternatively, a face area with a highest definition in the captured image is determined as the second to-be-processed image, and the other face area is determined as the first to-be-processed image. Alternatively, a face image shot first is determined as the second to-be-processed image, and a face image shot later is determined as the first to-be-processed image. Alternatively, each face image is identified and the user may define which face image is the first to-be-processed image and which face image is the second to-be-processed image. For example, the user may drag a specific face image to the first area or the second area, and a face image dragged to the first area is the first to-be-processed image, and a face image dragged to the second area is the second to-be-processed image. Moreover, the dragged face image may be automatically resized to fit in the area.

In another embodiment, if the captured image includes three or more face images, the acquiring the first to-be-processed image corresponding to the first to-be-processed object and the second to-be-processed image corresponding to the second to-be-processed object from the captured image includes: determining a face image of a user who enters shot first as the second to-be-processed image, and determining a face image of a user who enters shot second as the first to-be-processed image. Alternatively, a face image with a highest definition is determined as the second to-be-processed image, and a face image having the highest definition among remaining face images is determined as the first to-be-processed image. Alternatively, based on sizes of the face areas, a largest face area is determined as the second to-be-processed image, and a second largest face area is determined as the first to-be-processed image. Alternatively, each face area is marked and the user may choose which face image is the first to-be-processed image and which face image is the second to-be-processed image.

The to-be-processed object that meets the preset condition includes at least one of: an to-be-processed object that first enters the capture range of the photographing device; an to-be-processed object with a largest size in the captured image of the photographing device; an to-be-processed object with a highest definition in the captured image of the photographing device; and an to-be-processed object of which an angle is at a smallest difference from a present angle (that is, by taking a face image as an example, a face image close to a front face image is preferable).

Figure 9:
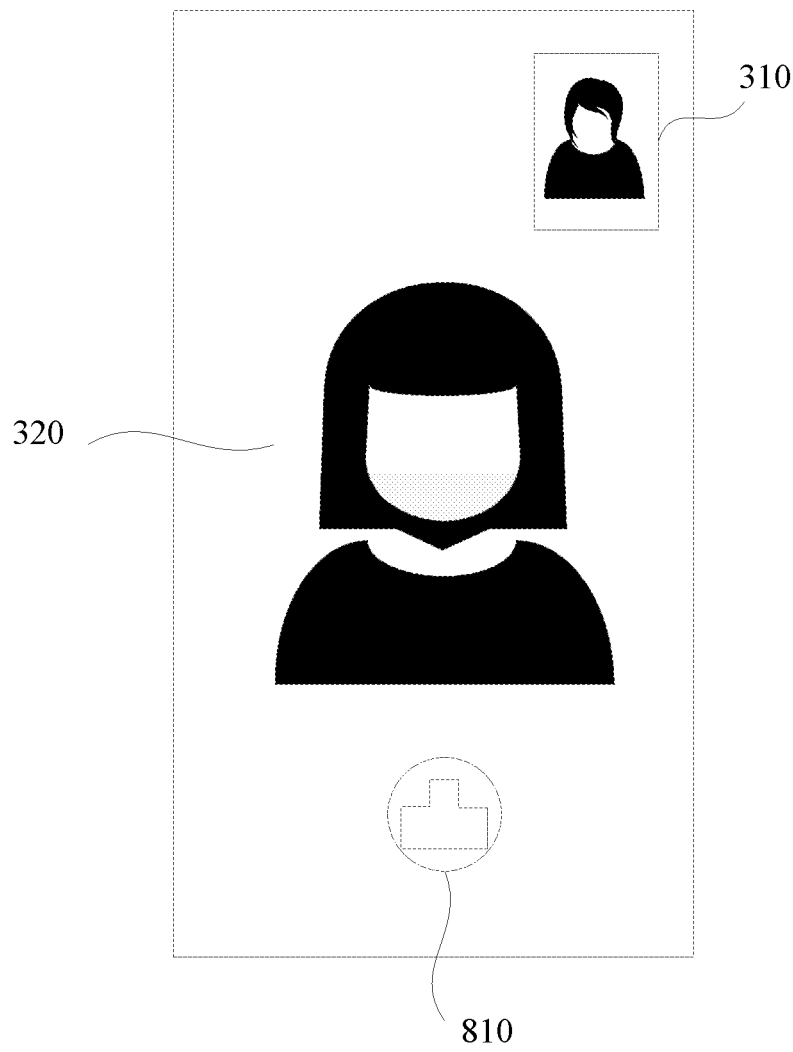
FIG. 9 is a schematic diagram of a fourth user interface according to an embodiment of the present disclosure.

When displaying the user interface and displaying the third preset image in the first area, the displaying the first to-be-processed image in the first area includes: replacing the third preset image in the first area with the first to-beprocessed image for display. Correspondingly, reference may be made to a schematic diagram of a fourth user interface shown in FIG. 9. The interface includes a first area 310 and a second area 320. Moreover, the user interface is similar to a chat interface during video interaction. A first to-be-processed image (for example, a face image) is displayed in the first area 310, and a second to-be-processed image (for example, a face image) is displayed in the second area 320. Both the first to-be-processed image and the second to-be-processed image are real-time images photographed by a camera. A reference numeral 810 denotes a photographing button, and a photographing interface may be exited by triggering the photographing button 810. If a first to-be-processed object (for example, a face area) moves out of a capture range of the photographing device, i.e., the first to-be-processed object leaves shot, the third preset image is resumed to display in the first area 310, i.e., a template image or a base image defaulted by system is displayed in the first area 310. If a second to-be-processed object (for example, a face area) moves out of the capture range of the photographing device, the first to-be-processed image is displayed in the second area, and the third preset image is resumed to display in the first area. That is, when the second to-be-processed object leaves the shot, the first to-be-processed object is moved to the second area for display, and the template image or the base image defaulted by the system is resumed to display in the first area. In a process of capturing images by the photographing device, the user may be prompted to face the camera by voice or text, so as to take a front face image of the user. If the front face image has not been captured, a slightly inclined face image may be adjusted with image processing algorithm to obtain the front face image.

In an embodiment, the second to-be-processed image is an image photographed in real time, and when capturing the second to-be-processed image, multiple users enter the shot, i.e., multiple users are within a photographing range of the camera. If multiple to-be-processed objects enter the capture range of the photographing device (for example, the photographing range of the camera), multiple second to-be-processed objects in the second to-be-processed image include an to-be-processed object that meets a preset condition. The to-be-processed object that meets the preset condition includes at least one of: an to-be-processed object that first enters the capture range of the photographing device; an to-be-processed object with a largest size in the captured image of the photographing device; an to-be-processed object with a highest definition in the captured image of the photographing device; and an to-be-processed object of which an angle is at a smallest difference from a present angle (that is, an image close to a front face image is preferable). That is, the image of the user that enters shot first, or a user image with a largest size, or a user image with a highest definition, or a user image with a most front face is displayed in the second area.

In an embodiment, in a case that the first to-be-processed image displayed in the first area includes a preset image and multiple users are to be shot, if multiple to-be-processed objects enter the capture range of the photographing device, multiple second to-be-processed objects in the second to-be-processed image include an to-be-processed object that meets a preset condition. The to-be-processed object that meets the preset condition includes at least one of: an to-be-processed object that first enters the capture range of the photographing device; an to-be-processed object with a largest size in a captured image of the photographing device; an to-be-processed object with a highest definition in a captured image of the photographing device; and an to-be-processed object of which an angle is at a smallest difference from a present angle (that is, an image close to a front face image is preferable). That is, the image of the user that enters shot first, or a user image with a largest size, or a user image with a highest definition, or a user image with a most front face is displayed in the second area.

In step 120, in response to acquiring a fusion instruction, the multiple to-be-processed images and one or more first preset images are fused to obtain one or more target images subjected to fusion, where the target image includes to-be-processed objects respectively corresponding to the multiple to-be-processed images.

The fusion instruction may be a linked instruction generated in response to a user triggering a preset fusion icon, or an instruction triggered in a case that a blank space of a display screen is touched. In an embodiment, if the to-be-processed image is an image including one person, the first preset image may also be an image including one person. Fusing the to-be-processed image and the first preset image may include: replacing a face in the first preset image with a face in the to-be-processed image to obtain a target image, in which case the face in the to-be-processed image and the face in the target image are the same; or replacing a face in the first preset image with a face in the to-be-processed image to obtain a target image, and decorating and beautifying the face based on a special effect of the first preset image, in which case the face in the target image is obtained by beautifying the face in the to-be-processed image; or fusing a face in the to-be-processed image with a face in the first preset image, in which case the face in the to-be-processed image and the face in the target image are different from each other. Through the special effect gameplay provided by the above image processing, an image processing mode is enriched, and the use experience and the enjoyment of the user are improved. If there are two to-be-processed images, i.e., a first to-be-processed image and a second to-be-processed image, both the first to-be-processed image and the second to-be-processed image are images including one person, and the first preset image is an image including two persons, fusing the to-be-processed image and the first preset image includes: replacing a face of one person in the first preset image with a face in the first to-be-processed image, and replacing a face of the other person in the first preset image with a face in the second to-be-processed image, to obtain a target image including the face in the first to-be-processed image, the face in the second to-be-processed image, bodies of the two persons in the first preset image and a background in the first preset image. In this way, clothing, make-up, postures and the like of persons in the first preset image may be retained, photographing postures, clothing and make-up are expanded, and the experience of the user is improved. Similarly, if there are multiple first preset images, a face in each of the first preset images may be sequentially replaced with a face in the to-be-processed image, to obtain multiple corresponding target images, thereby improving the experience of the user.

In step 130, the one or more target images subjected to fusion are displayed.

Optionally, after acquiring the target image, a short video with a dynamic effect may be generated based on the target image. For example, frames of the one or more target images are played from near to far in sequence (similar to an automatic play effect of slides), and a dynamic effect such as shining stars is displayed, which enhances a processing effect of image fusion and improves the use experience of the user.

In a method for image processing according to an embodiment, multiple to-be-processed images and one or more first preset images are fused to obtain one or more target images subjected to fusion, and the target image includes to-be-processed objects respectively corresponding to the multiple to-be-processed images, which realizes processing on to-be-processed images, enriches an image processing mode, and contributes to improving the use experience and the enjoyment of the user.

FIG. 10 is a flowchart of a method for image processing according to another embodiment of the present disclosure. An optional implementation of step 120 "in response to acquiring a fusion instruction, the multiple to-be-processed images and one or more first preset images are fused to obtain one or more target images subjected to fusion, where the target image includes to-be-processed objects respectively corresponding to the multiple to-be-processed images" is further provided in the present embodiment on the basis of the above embodiments. The same or similar contents as those in the above embodiments are not explained in the present embodiment. For the relevant contents, reference may be made to the above embodiments.

As shown in FIG. 10, the method for processing the image includes the following steps 1010 to 1050.

In step 1010, upon detecting a trigger operation on a preset identification, a user interface is displayed, where the user interface includes a first area and a second area, the first area is configured to display a first to-be-processed image, the second area is configured to display a second to-be-processed image, and the second to-be-processed image includes an image captured by a photographing device.

In step 1020, the first to-be-processed image and the second to-be-processed image are acquired.

In step 1030, a first to-be-processed object is acquired from the first to-be-processed image, and a second to-be-processed object is acquired from the second to-be-processed image.

In an embodiment, a first to-be-processed object is acquired from the first to-be-processed image by: in a case that the first to-be-processed image includes multiple to-be-processed objects, acquiring a first to-be-processed object that meets a preset condition in the first to-be-processed image. For example, if the first to-be-processed image is a multi-person photo, a face image area with a largest size and/or a highest definition and/or a most front face may be identified as the first to-be-processed object.

In another embodiment, a first to-be-processed object is acquired from the first to-be-processed image by: in a case that the first to-be-processed image includes multiple to-be-processed objects, marking the multiple to-be-processed objects in the first to-be-processed image; displaying identification information of each of the multiple to-be-processed objects; and in response to acquiring a selection instruction for identification information of the first to-be-processed object in the multiple to-be-processed objects, acquiring the first to-be-processed object in the first to-be-processed image. For example, if the first to-be-processed image is a multi-person photo, each face image area may be circled separately, and the user may choose which face image area is the first to-be-processed object.

In an embodiment, rather than first acquiring the first to-be-processed image and the second to-be-processed image and then acquiring the first to-be-processed object from the first to-be-processed image and acquiring the second to-be-processed object from the second to-be-processed image, the first to-be-processed object and the second to-be-processed object may be directly acquired. For example, as shown in FIG. 7, an image including a first to-be-processed object and a second to-be-processed object is captured by a photographing device. The first to-be-processed object and the second to-be-processed object may be directly identified from the large image, rather than preferentially identifying a rectangular image including the first to-be-processed object as the first to-be-processed image and a rectangular image including the second to-be-processed object as the second to-be-processed image and then identifying the first to-be-processed object based on the first to-be-processed image and identifying the second to-be-processed object based on the second to-be-processed image.

In step 1040, in response to acquiring a fusion instruction, the first to-be-processed object and the second to-be-processed object are fused into one or more first preset images to obtain one or more target images subjected to fusion, where the target image includes the first to-be-processed object subjected to fusion and the second to-be-processed object subjected to fusion.

In an embodiment, the fusion instruction may be triggered by a preset fusion icon, button or control, or by directly touching a blank area of a screen. In an embodiment, the first to-be-processed object and the second to-be-processed object are fused into one or more first preset images to obtain one or more target images subjected to fusion by: selecting a target preset image from multiple first preset images, where the target preset image includes a third to-be-processed object and a fourth to-be-processed object; and replacing one of the third to-be-processed object and the fourth to-be-processed object with the first to-be-processed object, and replacing the other of the third to-be-processed object and the fourth to-be-processed object with the second to-be-processed object, to obtain the fused target image. For example, if the target preset image is an image including two persons M (be regarded as the third to-be-processed object) and N (be regarded as the fourth to-be-processed object), the first to-be-processed object is a face image of a user A, and the second to-be-processed object is a face image of a user B, a process of image fusion may include: fusing a face of the person N in the target preset image and a face of the user A, and fusing a face of the person M and a face of the user B, to obtain a target image; or fusing a face of the person N and a face of the user B, and fusing a face of the person M and a face of the user A, to obtain a target image. In this way, the clothing, make-up, postures and the like of persons in the target preset image may be retained, photographing postures, clothing and make-up are expanded, the experience of the user is improved, and an image processing effect and the enjoyment of the user in using the image processing function are improved. A specific process of fusion processing is explained by taking fusion of a face of the person N and a face of a user A as an example. In an embodiment, the face of the person N is directly replaced with the face of the user A to obtain a target image. In this case, the fourth to-be-processed object (i.e., the face of the person N) is the same as the first to-be-processed object (i.e., the face of the user A). In another embodiment, the face of the person N may be replaced with the face of the user A, and the face of the user A may be decorated and beautified based on a special effect of the person N to obtain a target image. For example, a flash special effect such as little stars is added. In yet another embodiment, the face of the person N may be fused with the face of the user A, to obtain a target image. In this case, the fourth to-be-processed object (i.e., the face of the person N) is different from the first to-be-processed object (i.e., the face of the user A). Through the special effect gameplay provided by the above image processing, an image processing mode is enriched, and the experience of the user is improved.

In order to enrich a style of the target image obtained after image processing and further improve the experience of the user, the multiple first preset images may be in different styles, such as images of various genres. During image fusion, a terminal device selects a target preset image from the multiple first preset images, and performs the fusion based on the target preset image. In a subsequent fusion performed by the terminal device, a selected target preset image is different from the target preset image selected in the last fusion, so that the user may experience image effects of various styles. For example, the terminal device selects a first preset image for a first fusion, and selects a second preset image for a second fusion, and so on. Therefore, preset images selected during each fusion are different, and thus target images obtained after each fusion are different, thereby improving the user experience.

In an embodiment, the first to-be-processed object and the second to-be-processed object are fused into one or more first preset images to obtain one or more target images subjected to fusion by: displaying multiple first preset images; and in response to acquiring a selection instruction for a target preset image in the multiple first preset images, replacing one of a third to-be-processed object and a fourth to-be-processed object in the target preset image with the first to-be-processed object, and replacing the other of the third to-be-processed object and the fourth to-be-processed object with the second to-be-processed object, to obtain the fused target image. In an embodiment, a terminal device displays multiple first preset images, a user selects a first preset image to be used for image fusion, and the image fusion is performed based on the target preset image selected by the user. By supporting the user to select the target preset image, personalized image fusion processing can be achieved, which is beneficial to improving the use experience of the user.

In an embodiment, the first to-be-processed object and the second to-be-processed object are fused into one or more first preset images to obtain one or more target images subjected to fusion by: for each of the multiple first preset images, replacing one of a third to-be-processed object and a fourth to-be-processed object in the first preset image with the first to-be-processed object, and replacing the other of the third to-be-processed object and the fourth to-be-processed object with the second to-be-processed object, to obtain multiple target images subjected to fusion, and display the multiple target images subjected to fusion. For example, if multiple target images subjected to fusion are displayed in a same user interface, a user may select one of them. After the user selects a specific target image, the target image selected by the user is enlarged for display, and other target images disappear. Further, the user may view a next enlarged target image by swiping on the screen, and then view an enlarged target image after the next enlarged target image by continuing swiping on the screen. Alternatively, the terminal device may automatically display the multiple target images subjected to fusion in a circulation manner, i.e., the multiple target images are automatically displayed one by one on the terminal screen in order to enhance the friendliness of the interaction interface and improve the use experience of the user.

In an embodiment, after displaying the one or more target images subjected to fusion, the method for processing the image further includes: in response to acquiring an exchange instruction, exchanging the first to-be-processed object and the second to-be-processed object in the fused target image. For example, since the third to-be-processed object or the fourth to-be-processed object is randomly replaced with the first to-be-processed object or the second to-be-processed object in the image fusion process, the obtained target image may be unsatisfactory to the user. For example, the target image is an image including two persons, in which a face of a person M corresponds to a face of a user B, and a face of a person N corresponds to a face of a user A, while the user A or B is dissatisfied with the current target image or wants to try other fusion effects. In this case, the user may trigger an exchange instruction. Upon receiving the exchange instruction, the terminal device conducts the fusion for the face of the person M and the face of the user B, and conducts the fusion for the face of the person N and the face of the user B, to enhance the enjoyment in a use process and provide the user with a satisfactory result.

It should be understood that if the first to-be-processed image displayed in the first area may alternatively be a template image defaulted by system, the second to-be-processed image displayed in the second area may alternatively be fused with the template image. If the first to-be-processed image displayed in the first area is an image of a user, and the second to-be-processed image displayed in the second area is an image of the user captured by a photographing device, the two images of the user may be fused in this case.

In step 1050, the one or more target images subjected to fusion are displayed.

It should be understood that after displaying the target image, the target image may be shared with friends, forums, Weibo, moments and other platforms in response to acquiring a sharing instruction.

In a method for image processing according to an embodiment of the present disclosure, an optional implementation for fusion processing is provided. The fusion processing is face changing processing in essence. That is, a face in a first preset image and a face in an to-be-processed image are subjected to fusion processing, so that the clothing, make-up, postures and the like of persons in the first preset image may be retained, photographing postures, clothing and make-up are expanded, the experience of the user is improved, an image processing effect and the enjoyment of the user in using the image processing function are improved, and the enjoyment of the user in using a special effect is improved.

FIG. 11 is a schematic structural diagram of an apparatus for image processing according to an embodiment of the present disclosure. The apparatus according to the embodiment of the present disclosure may be configured in a client device or a server. As shown in FIG. 11, the apparatus for processing the image includes an acquisition module 1110, a fusion module 1120 and a display module 1130. The acquisition module 1110 is configured to acquire multiple to-be-processed images. The fusion module 1120 is configured to: in response to acquiring a fusion instruction, fuse the multiple to-be-processed images and one or more first preset images to obtain one or more target images subjected to fusion, where the target image includes to-be-processed objects respectively corresponding to the multiple to-be-processed images. The display module 1130 is configured to display the one or more target images subjected to fusion.

Optionally, the acquisition module 1110 includes: a display unit configured to: upon detecting a trigger operation on a preset identification, display a user interface, where the user interface includes a first area and a second area, the first area is configured to display a first to-be-processed image, the second area is configured to display a second to-be-processed image, and the second to-be-processed image includes an image captured by a photographing device; and a first acquisition unit configured to acquire the first to-be-processed image and the second to-be-processed image.

Optionally, the user interface further includes one or more second preset images. The display unit is further configured to display the first to-be-processed image in the one or more second preset images in the first area before acquiring the first to-be-processed image and the second to-be-processed image.

Optionally, when displaying the user interface, a third preset image is displayed in the first area. Correspondingly, the display unit is further configured to replace the third preset image displayed in the first area with the first to-be-processed image in the one or more second preset images.

Optionally, the acquisition module 1110 further includes: a first acquisition unit configured to acquire a captured image of the photographing device, where the captured image includes a first to-be-processed object and a second to-be-processed object; and acquire the first to-be-processed image corresponding to the first to-be-processed object and the second to-be-processed image corresponding to the second to-be-processed object from the captured image. Correspondingly, the display unit is further configured to display the first to-be-processed image in the first area and display the second to-be-processed image in the second area.

Optionally, if multiple to-be-processed objects enter a capture range of the photographing device, a second to-be-processed object in the second to-be-processed image includes an to-be-processed object that meets a preset condition in the multiple to-be-processed objects.

Optionally, if a second to-be-processed object in the second to-be-processed image moves out of a capture range of the photographing device, the first acquisition unit is configured to determine an to-be-processed object that meets a preset condition in remaining of the multiple to-be-processed objects captured by the photographing device except the second to-be-processed object as the second to-be-processed object.

Optionally, the first to-be-processed object in the first to-be-processed image includes an to-be-processed object that meets a preset condition in remaining of the multiple to-be-processed objects captured by the photographing device except the second to-be-processed object, and the second to-be-processed object includes an to-be-processed object in the second to-be-processed image.

Optionally, if the first to-be-processed object moves out of a capture range of the photographing device, the display unit is further configured to resume to display the third preset image in the first area.

Optionally, if the second to-be-processed object moves out of a capture range of the photographing device, the display unit is further configured to display the first to-be-processed image in the second area, and resume to display the third preset image in the first area.

Optionally, the to-be-processed object that meets the preset condition includes at least one of:

an to-be-processed object that first enters the capture range of the photographing device;

an to-be-processed object with a largest size in a captured image of the photographing device;

an to-be-processed object with a highest definition in a captured image of the photographing device; and an to-be-processed object of which an angle is at a smallest difference from a present angle.

Optionally, the fusion module 1120 includes: a second acquisition unit configured to acquire a first to-be-processed object from the first to-be-processed image, and acquire a second to-be-processed object from the second to-be-processed image; and a fusion unit configured to fuse the first to-be-processed object and the second to-be-processed object into the one or more first preset images to obtain the one or more target images subjected to fusion, where the target image includes the first to-be-processed object subjected to fusion and the second to-be-processed object subjected to fusion.

Optionally, the fusion unit includes: a selection subunit configured to select a target preset image from multiple first preset images, where the target preset image includes a third to-be-processed object and a fourth to-be-processed object; and a replacement subunit configured to replace one of the third to-be-processed object and the fourth to-be-processed object with the first to-be-processed object, and replace the other of the third to-be-processed object and the fourth to-be-processed object with the second to-be-processed object, to obtain the target image subjected to fusion.

Optionally, the fusion unit includes: a display subunit configured to display multiple first preset images. The replacement subunit is further configured to: in response to acquiring a selection instruction for a target preset image in the multiple first preset images, replace one of a third to-be-processed object and a fourth to-be-processed object in the target preset image with the first to-be-processed object, and replace the other of the third to-be-processed object and the fourth to-be-processed object with the second to-be-processed object, to obtain the target image subjected to fusion.

Optionally, the replacement subunit is further configured to: for each of multiple first preset images, replace one of a third to-be-processed object and a fourth to-be-processed object in the first preset image with the first to-be-processed object, and replace the other of the third to-be-processed object and the fourth to-be-processed object with the second to-be-processed object, to obtain multiple target images subjected to fusion.

Optionally, the fusion module 1120 further includes an exchange unit configured to: after displaying the one or more target images subjected to fusion, in response to acquiring an exchange instruction, exchange the first to-be-processed object and the second to-be-processed object in the one or more target images subjected to fusion.

The steps of the method executed by the client device according to the method embodiment of the present disclosure may be performed by the apparatus according to the embodiment of the present disclosure. The specific steps implemented and advantageous effects are not repeated herein.

Figure 12:
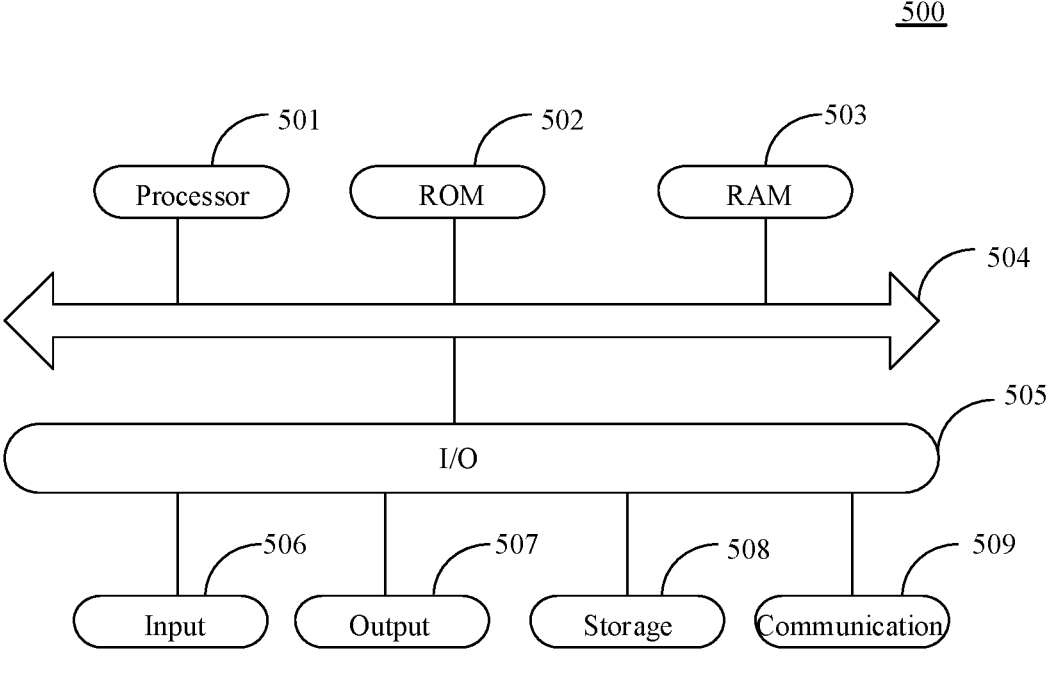
FIG. 12 is a schematic structural diagram of an electronic device according to an embodiment of the present disclosure.

FIG. 12 is a schematic structural diagram of an electronic device according to an embodiment of the present disclosure. Reference is made to FIG. 12, which is a schematic structural diagram of an electronic device 500 suitable for implementing the embodiments of the present disclosure. The electronic device 500 according to the embodiment of the present disclosure may include, but is not limited to, mobile phones, laptops, digital broadcast receivers, Personal Digital Assistants (PDAs), Tablet Computers (PADs), Portable Multimedia Players (PMPs), vehicle-mounted terminals (such as in-vehicle navigation terminals), wearable electronic devices and other mobile terminals and fixed terminals such as digital TVs, desktop computers and smart home devices. The electronic device shown in FIG. 12 is only exemplary, and should not indicate any limitation to the function and scope of application of the embodiments of the present disclosure.

As shown in FIG. 12, the electronic device 500 may include a processing apparatus (e.g., a central processing unit or a graphics processor) 501, which may execute various operations and processing based on a program stored in a read only memory (ROM) 502 or a program loaded from a storage apparatus 508 into a random access memory (RAM) 503 to implement the method for . . . according to the embodiment of the present disclosure. The RAM 503 is further configured to store various programs and data required by the electronic device 500 to perform an operation. The processing apparatus 501, the ROM 502 and the RAM 503 are connected to each other through a bus 504. An input/output (I/O) interface 505 is also connected to the bus 504.

Generally, the I/O interface 505 may be connected to: an input apparatus 506, such as a touch screen, a touch panel, a keyboard, a mouse, a camera, a microphone, an accelerometer, and a gyroscope; an output apparatus 507, such as a liquid crystal display (LCD), a speaker, and a vibrator; a storage apparatus 508 such as a magnetic tape and a hard disk; and a communication apparatus 509. The communication apparatus 509 enables wireless or wired communication between the electronic device 500 and other devices for data exchanging. Although FIG. 12 shows an electronic device 500 having various components, it should be understood that the illustrated components are not necessarily required to all be implemented or included. Alternatively, more or fewer components may be implemented or included.

Particularly, according to the embodiments of the present disclosure, the processes described above with reference to the flowcharts may be implemented as a computer software program. For example, a computer program product is further provided as an embodiment in the present disclosure, including a computer program carried on a non-transitory computer readable medium. The computer program includes program code for performing the method shown in the flowchart, to implement the method as described above. In the embodiment, the computer program may be downloaded and installed from the network via the communication apparatus 509, or installed from the storage apparatus 508, or installed from the ROM 502. When the computer program is executed by the processing apparatus 501, the functions defined in the method according to the embodiment of the present disclosure are performed.

It is to be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device.

In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes included in the computer readable medium may be transmitted via any proper medium including but not limited to: a wire, an optical cable, radio frequency (RF) and the like, or any proper combination thereof.

In some embodiments, the client device and the server may communicate using any currently known or future developed network protocol such as HyperText Transfer Protocol (HTTP), and may be interconnected with any form or medium of digital data communication (e.g., a communication network). Examples of the communication network include a local area network ("LAN"), a wide area network ("WAN"), the internet (e.g., the Internet), and an end-to-end network (e.g., ad hoc end-to-end network) or any of a currently known or a future developed network.

The computer readable medium may be incorporated in the electronic device, or may exist alone without being assembled into the electronic device.

The computer readable medium carries one or more programs. The one or more programs, when executed by the electronic device, cause the electronic device to: acquire multiple to-be-processed images;

in response to acquiring a fusion instruction, fuse the multiple to-be-processed images and one or more first preset images to obtain one or more target images subjected to fusion, where the target image includes to-be-processed objects respectively corresponding to the multiple to-be-processed images; and display the one or more target images subjected to fusion.

Optionally, when the one or more programs are executed by the electronic device, the electronic device may perform other steps according to the above embodiments.

The computer program code for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flowcharts and block diagrams in the drawings illustrate the architecture, functions and operations that may be implemented by the system, method and computer program product according to the embodiments of the present disclosure. In this regard, each block in the flowcharts or the block diagrams may represent a module, a program segment, or a part of code. The module, the program segment, or the part of code contains one or more executable instructions for implementing the specified logical function. It should be also noted that, in some alternative implementations, the functions shown in the blocks may be performed in an order different from the order shown in the drawings. For example, two blocks shown in succession may actually be executed in parallel, or sometimes may be executed in a reverse order, which depends on the functions involved. It should also be noted that, each block in the block diagrams and/or the flowcharts and a combination of blocks in the block diagrams and/or the flowcharts may be implemented by a dedicated hardware-based system performing specified functions or operations, or may be implemented by a combination of dedicated hardware and computer instructions.

The units mentioned in the description of the embodiments of the present disclosure may be implemented by means of software, or otherwise by means of hardware. The name of the unit does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, a system, an apparatus or a device in an electronic, magnetic, optical, electromagnetic, infrared, or semi-conductive form, or any suitable combination thereof. The machine readable storage medium, for example, includes an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

According to one or more embodiments of the present disclosure, a method for image processing is provided according to the present disclosure. The method includes: acquiring multiple to-be-processed images; in response to acquiring a fusion instruction, fusing the multiple to-be-processed images and one or more first preset images to obtain one or more target images subjected to fusion, where the target image includes to-be-processed objects respectively corresponding to the multiple to-be-processed images; and displaying the one or more target images subjected to fusion.

According to one or more embodiments of the present disclosure, in the method for processing the image according to the present disclosure, the acquiring multiple to-be-processed images includes: upon detecting a trigger operation on a preset identification, displaying a user interface, where the user interface includes a first area and a second area, the first area is configured to display a first to-be-processed image, the second area is configured to display a second to-be-processed image, and the second to-be-processed image includes an image captured by a photographing device; and acquiring the first to-be-processed image and the second to-be-processed image.

According to one or more embodiments of the present disclosure, in the method for processing the image according to the present disclosure, the user interface further includes one or more second preset images: and before acquiring the first to-be-processed image and the second to-be-processed image, the method further includes: displaying the first to-be-processed image in the one or more second preset images in the first area.

According to one or more embodiments of the present disclosure, in the method for processing the image according to the present disclosure, when displaying the user interface, a third preset image is displayed in the first area; and the displaying the first to-be-processed image in the one or more second preset images in the first area includes: replacing the third preset image displayed in the first area with the first to-be-processed image in the one or more second preset images.

According to one or more embodiments of the present disclosure, in the method for processing the image according to the present disclosure, before acquiring the first to-be-processed image and the second to-be-processed image, the method further includes: acquiring a captured image of the photographing device, where the captured image includes a first to-be-processed object and a second to-be-processed object; acquiring the first to-be-processed image corresponding to the first to-be-processed object and the second to-be-processed image corresponding to the second to-be-processed object from the captured image; and displaying the first to-be-processed image in the first area and displaying the second to-be-processed image in the second area.

According to one or more embodiments of the present disclosure, in the method for processing the image according to the present disclosure, when displaying the user interface, a third preset image is displayed in the first area; and the displaying the first to-be-processed image in the first area includes: replacing the third preset image displayed in the first area with the first to-be-processed image.

According to one or more embodiments of the present disclosure, in the method for processing the image according to the present disclosure, if multiple to-be-processed objects enter a capture range of the photographing device, a second to-be-processed object in the second to-be-processed image includes an to-be-processed object that meets a preset condition in the multiple to-be-processed objects.

According to one or more embodiments of the present disclosure, the method for processing the image according to the present disclosure further includes: if a second to-be-processed object in the second to-be-processed image moves out of a capture range of the photographing device, determining an to-be-processed object, that meets a preset condition in remaining of the multiple to-be-processed objects captured by the photographing device except the second to-be-processed object, as the second to-be-processed object.

According to one or more embodiments of the present disclosure, in the method for processing the image according to the present disclosure, the first to-be-processed object in the first to-be-processed image includes an to-be-processed object that meets a preset condition in remaining of the multiple to-be-processed objects captured by the photographing device except the second to-be-processed object, and the second to-be-processed object includes an to-be-processed object in the second to-be-processed image.

According to one or more embodiments of the present disclosure, the method for processing the image according to the present disclosure further includes: if the first to-be-processed object moves out of a capture range of the photographing device, resuming to display the third preset image in the first area.

According to one or more embodiments of the present disclosure, the method for processing the image according to the present disclosure further includes: if the second to-be-processed object moves out of a capture range of the photographing device, displaying the first to-be-processed image in the second area, and resuming to display the third preset image in the first area.

According to one or more embodiments of the present disclosure, in the method for processing the image according to the present disclosure, the to-be-processed object that meets the preset condition includes at least one of: an to-be-processed object that first enters the capture range of the photographing device; an to-be-processed object with a largest size in a captured image of the photographing device; an to-be-processed object with a highest definition in a captured image of the photographing device; and an to-be-processed object of which an angle is at a smallest difference from a present angle.

According to one or more embodiments of the present disclosure, in the method for processing the image according to the present disclosure, the fusing the multiple to-be-processed images and one or more first preset images to obtain one or more target images subjected to fusion includes: acquiring a first to-be-processed object from the first to-be-processed image, and acquiring a second to-be-processed object from the second to-be-processed image; and fusing the first to-be-processed object and the second to-be-processed object into the one or more first preset images to obtain the one or more target images subjected to fusion, where the target image includes the first to-be-processed object subjected to fusion and the second to-be-processed object subjected to fusion.

According to one or more embodiments of the present disclosure, in the method for processing the image according to the present disclosure, the fusing the first to-be-processed object and the second to-be-processed object into the one or more first preset images to obtain the one or more target images subjected to fusion includes: selecting a target preset image from multiple first preset images, where the target preset image includes a third to-be-processed object and a fourth to-be-processed object; and replacing one of the third to-be-processed object and the fourth to-be-processed object with the first to-be-processed object, and replacing the other of the third to-be-processed object and the fourth to-be-processed object with the second to-be-processed object, to obtain the target image subjected to fusion.

According to one or more embodiments of the present disclosure, in the method for processing the image according to the present disclosure, the fusing the first to-be-processed object and the second to-be-processed object into the one or more first preset images to obtain the one or more target images subjected to fusion includes: displaying multiple first preset images; and in response to acquiring a selection instruction for a target preset image in the multiple first preset images, replacing one of a third to-be-processed object and a fourth to-be-processed object in the target preset image with the first to-be-processed object, and replacing the other of the third to-be-processed object and the fourth to-be-processed object with the second to-be-processed object, to obtain the target image subjected to fusion.

According to one or more embodiments of the present disclosure, in the method for processing the image according to the present disclosure, the fusing the first to-be-processed object and the second to-be-processed object into the one or more first preset images to obtain the one or more target images subjected to fusion includes: for each of multiple first preset images, replacing one of a third to-be-processed object and a fourth to-be-processed object in the first preset image with the first to-be-processed object, and replacing the other of the third to-be-processed object and the fourth to-be-processed object with the second to-be-processed object, to obtain multiple target images subjected to fusion.

According to one or more embodiments of the present disclosure, in the method for processing the image according to the present disclosure, after displaying the one or more target images subjected to fusion, the method further includes: in response to acquiring an exchange instruction, exchanging the first to-be-processed object and the second to-be-processed object in the target image subjected to fusion.

According to one or more embodiments of the present disclosure, an apparatus for image processing is provided according to the present disclosure. The apparatus includes: an acquisition module configured to acquire multiple to-be-processed images; a fusion module configured to: in response to acquiring a fusion instruction, fuse the multiple to-be-processed images and one or more first preset images to obtain one or more target images subjected to fusion, where the target image includes to-be-processed objects respectively corresponding to the multiple to-be-processed images; and a display module configured to display the one or more target images subjected to fusion.

According to one or more embodiments of the present disclosure, an electronic device is provided according to the present disclosure. The electronic device includes: one or more processors; and a memory configured to store one or more programs.

The one or more programs, when executed by the one or more processors, cause the one or more processors to implement the method for processing the image according to any one of the embodiments of the present disclosure.

According to one or more embodiments of the present disclosure, a computer readable storage medium on which a computer program is stored is provided according to the present disclosure. The program, when executed by a processor, implements the method for processing the image according to any one of the embodiments of the present disclosure.

A computer program product is further provided according to an embodiment of the present disclosure. The computer program product includes a computer program or instruction. The computer program or instruction, when executed by a processor, implements the foregoing method for processing the image.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for image processing, comprising:
acquiring a plurality of images;
in response to acquiring a fusion instruction, fusing the plurality of images and one or more first preset images, to obtain one or more target images subjected to fusion, wherein the target image comprises objects respectively corresponding to the plurality of images; and
displaying the one or more target images subjected to fusion,
wherein the plurality of images comprise a first image and a second image, and before acquiring the plurality of images, the method further comprises:
upon detecting a trigger operation on a preset identification, displaying a user interface, wherein the user interface comprises a first area and a second area, the first area is configured to display the first image, the second area is configured to display the second image, and the second image comprises an image captured by a photographing device.

2. The method according to claim 1, wherein one or more second preset images are further displayed in the user interface; and
before acquiring the first image and the second image, the method further comprises:
displaying the first image in the one or more second preset images in the first area.

3. The method according to claim 2, wherein when displaying the user interface, a third preset image is displayed in the first area; and
the displaying the first image in the one or more second preset images in the first area comprises:
replacing the third preset image displayed in the first area with the first image in the one or more second preset images.

4. The method according to claim 1, wherein before acquiring the first image and the second image, the method further comprises:
acquiring a captured image of the photographing device, wherein the captured image comprises a first object and a second object;
acquiring the first image corresponding to the first object and the second image corresponding to the second object from the captured image; and
displaying the first image in the first area and displaying the second image in the second area.

5. The method according to claim 4, wherein when displaying the user interface, a third preset image is displayed in the first area; and the displaying the first image in the first area comprises:
replacing the third preset image displayed in the first area with the first image.

6. The method according to claim 1, wherein if a plurality of objects enter a capture range of the photographing device, a second object in the second image comprises an object that meets a preset condition in the plurality of objects.

7. The method according to claim 1, further comprising:
if a second object in the second image moves out of a capture range of the photographing device, determining an object that meets a preset condition in remaining of a plurality of objects captured by the photographing device except the second object as the second object.

8. The method according to claim 4, wherein the first object in the first image comprises an object that meets a preset condition in remaining of a plurality of objects captured by the photographing device except the second object, and the second object comprises an object in the second image.

9. The method according to claim 5, further comprising:
if the first object moves out of a capture range of the photographing device, resuming to display the third preset image in the first area.

10. The method according to claim 5, further comprising:
if the second object moves out of a capture range of the photographing device, displaying the first image in the second area, and resuming to display the third preset image in the first area.

11. The method according to claim 6, wherein the object that meets the preset condition comprises at least one of:
an object that first enters the capture range of the photographing device;
an object with a largest size in a captured image of the photographing device;
an object with a highest definition in a captured image of the photographing device; and
an object of which an angle is at a smallest difference from a present angle.

12. The method according to claim 1, wherein the fusing the plurality of images and one or more first preset images to obtain one or more target images subjected to fusion comprises:
acquiring a first object from the first image, and acquiring a second object from the second image; and
fusing the first object and the second object into the one or more first preset images to obtain the one or more target images subjected to fusion, wherein the target image comprises the first object subjected to fusion and the second object subjected to fusion.

13. The method according to claim 12, wherein the fusing the first object and the second object into the one or more first preset images to obtain the one or more target images subjected to fusion comprises:
selecting a target preset image from a plurality of first preset images, wherein the target preset image comprises a third object and a fourth object; and
replacing one of the third object and the fourth object with the first object, and replacing the other of the third object and the fourth object with the second object, to obtain the target image subjected to fusion.

14. The method according to claim 12, wherein the fusing the first object and the second object into the one or more first preset images to obtain the one or more target images subjected to fusion comprises:
displaying a plurality of first preset images; and
in response to acquiring a selection instruction for a target preset image in the plurality of first preset images, replacing one of a third object and a fourth object in the target preset image with the first object, and replacing the other of the third object and the fourth object with the second object, to obtain the target image subjected to fusion.

15. The method according to claim 12, wherein the fusing the first object and the second object into the one or more first preset images to obtain the one or more target images subjected to fusion comprises:

for each of a plurality of first preset images, replacing one of a third object and a fourth object in the first preset image with the first object, and replacing the other of the third object and the fourth object with the second object, to obtain a plurality of target images subjected to fusion.

16. The method according to claim 13, wherein after displaying the one or more target images subjected to fusion, the method further comprises:

in response to acquiring an exchange instruction, exchanging the first object and the second object in the target image subjected to fusion.

17. An electronic device, comprising:

one or more processors; and a storage apparatus configured to store one or more programs, wherein the one or more programs, when executed by the one or more processors, cause the one or more processors to implement:

acquiring a plurality of images;

in response to acquiring a fusion instruction, fusing the plurality of images and one or more first preset images, to obtain one or more target images subjected to fusion, wherein the target image comprises objects respectively corresponding to the plurality of images; and displaying the one or more target images subjected to fusion, wherein the plurality of images comprise a first image and a second image, and before acquiring the plurality of images, the one or more processors are further caused to implement:

upon detecting a trigger operation on a preset identification, displaying a user interface, wherein the user interface comprises a first area and a second area, the first area is configured to display the first image, the second area is configured to display the second image, and the second image comprises an image captured by a photographing device.

18. A non-transitory computer readable storage medium on which a computer program is stored, wherein the program, when executed by a processor, implements:

acquiring a plurality of images;

in response to acquiring a fusion instruction, fusing the plurality of images and one or more first preset images, to obtain one or more target images subjected to fusion, wherein the target image comprises objects respectively corresponding to the plurality of images; and displaying the one or more target images subjected to fusion, wherein the plurality of images comprise a first image and a second image, and before acquiring the plurality of images, the program, when executed by the processor, further implements:

upon detecting a trigger operation on a preset identification, displaying a user interface, wherein the user interface comprises a first area and a second area, the first area is configured to display the first image, the second area is configured to display the second image, and the second image comprises an image captured by a photographing device.

* * * * *